United States Patent
Sirbu Villa (10) Patent No.: US 11,180,329 B2
(45) Date of Patent: Nov. 23, 2021

(54) DEVICE FOR DISPENSING ITEMS FROM A STACK OF NESTED ITEMS, IN PARTICULAR CUP LIDS

(71) Applicant: EVOCA S.P.A., Milan (IT)

(72) Inventor: Dan Alexie Sirbu Villa, Milan (IT)

(73) Assignee: EVOCA S.P.A., Milan (IT)

( * ) Notice: Subject to any disclaimer, the term of this patent is extended or adjusted under 35 U.S.C. 154(b) by 0 days.

(21) Appl. No.: 16/495,030

(22) PCT Filed: Oct. 19, 2018

(86) PCT No.: PCT/IB2018/058133
§ 371 (c)(1),
(2) Date: Sep. 17, 2019

(87) PCT Pub. No.: WO2019/077564
PCT Pub. Date: Apr. 25, 2019

(65) Prior Publication Data
US 2020/0283244 A1    Sep. 10, 2020

(30) Foreign Application Priority Data

Oct. 19, 2017  (EP) ..................................... 17197387
Jun. 5, 2018   (IT) ........................ 102018000006044

(51) Int. Cl.
    *B65G 59/10*   (2006.01)
    *A47F 1/08*    (2006.01)
(52) U.S. Cl.
    CPC ............ *B65G 59/102* (2013.01); *A47F 1/085* (2013.01); *B65G 59/103* (2013.01)
(58) Field of Classification Search
    CPC ............ A47F 1/085; B65D 2583/0431; B65G 59/102; B65G 59/103
    See application file for complete search history.

(56) References Cited

U.S. PATENT DOCUMENTS 1,634,566 A * 7/1927 Wessman ................ G07F 13/10
                                                    221/222
1,907,714 A * 5/1933 Benson ................. B65G 59/108
                                                    221/42
(Continued)

FOREIGN PATENT DOCUMENTS

EP    1575006 A1    9/2005
GB    2173777 A    10/1986
(Continued)

OTHER PUBLICATIONS

International Search Report and Written Opinion from International Application No. PCT/IB2018/058133 dated Dec. 17, 2018.

*Primary Examiner* — Gene O Crawford
*Assistant Examiner* — Kelvin L Randall, Jr.
(74) *Attorney, Agent, or Firm* — Marcus S. Simon (57) ABSTRACT

A dispensing device for dispensing lids from a stack of nested lids, including a magazine containing a stack; a denesting unit arranged at a bottom of the magazine to detach lids from the stack bottom; and denesting rollers each of which has a lower shelf, a first upper shelf above a bottom shelf, and a second upper shelf above the first upper shelf. Some of the rollers comprise a first separator, and other denesting rollers comprise at least a second separator. The rollers are rotatable between a rest position in which the stack rests on the lower shelves; a single release position in which the first separators engage the stack to detach the last item from the stack bottom; and said rest position and a multiple release position in which the second separators engage the stack to detach at least the last two items from the stack bottom.

15 Claims, 6 Drawing Sheets

(56) References Cited

U.S. PATENT DOCUMENTS

| | | | | |
|---|---|---|---|---|
| 2,721,002 A | * | 10/1955 | Smith | A21B 3/07 |
| | | | | 221/222 |
| 3,454,987 A | * | 7/1969 | Edwards | B65G 59/108 |
| | | | | 425/397 |
| 3,741,410 A | | 6/1973 | Henschke et al. | |
| 3,862,702 A | * | 1/1975 | Johnson | B65G 59/108 |
| | | | | 221/1 |
| 3,932,978 A | | 1/1976 | Kinney | |
| 3,958,720 A | * | 5/1976 | Anderson | B65G 59/108 |
| | | | | 221/93 |
| 4,044,896 A | * | 8/1977 | Reinecke | B65G 59/105 |
| | | | | 414/797.7 |
| 4,618,073 A | * | 10/1986 | Bartfield | G07F 13/10 |
| | | | | 221/104 |
| 7,270,248 B2 | * | 9/2007 | Schroeder | A47F 1/085 |
| | | | | 221/221 |
| 8,438,820 B1 | * | 5/2013 | Malavenda | B65B 43/44 |
| | | | | 53/513 |
| 10,395,464 B2 | * | 8/2019 | Van Den Driessche | |
| | | | | G07F 13/10 |
| 10,529,165 B2 | * | 1/2020 | Marquis | G07F 11/24 |
| 2007/0284388 A1 | * | 12/2007 | Liao | A47F 1/085 |
| | | | | 221/222 |
| 2011/0101017 A1 | * | 5/2011 | Schroeder | B65G 59/108 |
| | | | | 221/1 |

FOREIGN PATENT DOCUMENTS

| | | |
|---|---|---|
| WO | 2008141396 A1 | 11/2008 |
| WO | 2017174992 A1 | 10/2017 |

\* cited by examiner

DEVICE FOR DISPENSING ITEMS FROM A STACK OF NESTED ITEMS, IN PARTICULAR CUP LIDS

CROSS-REFERENCE TO RELATED APPLICATIONS

This application is a U.S. National Stage Application of PCT International Application No. PCT/1132018/058133 filed on 19 Oct. 2018, which claims priority from the European Patent Application No. 17197387.8 filed on Oct. 2017 and Italian Patent Application No. 102018000006044 filed on Jun. 2018, the entire disclosure of each of the foregoing applications is incorporated by reference.

TECHNICAL FIELD OF THE INVENTION

The invention relates to a device for dispensing items from a stack of nested items, in particular cup lids.

Lid dispensing devices of the type described above are advantageously applied in the field of automatic distribution, where they are mounted inside beverage vending machines in order to provide lids to be coupled to the cups, especially high-capacity cups, for beverages to be drunk "on to go".

STATE OF THE ART

Generally speaking, lid dispensing devices comprise a tower magazine, which is designed to house a stack of nested lids, and a denesting unit, which is arranged at the lower end of the magazine and is configured to detach the lids from the bottom of the stack one by one.

As it is known, lid dispensing devices of the type described above are affected by the problem of being subjected to frequent malfunctioning due to the fact that the lids, as they are relatively deep and have a shaped profile, have a tendency, when they are nested, to get firmly stuck inside one another and to form a stack that is so compact that the separation action of the denesting unit often becomes extremely hard and ineffective.

SUBJECT-MATTER AND SUMMARY OF THE INVENTION

The object of the invention is to provide a device for dispensing items from a stack of nested items, in particular cup lids, said dispensing device being capable of solving the aforementioned problem.

According to the invention, there is provided a device for dispensing items from a stack of nested items, in particular cup lids, according to the appended claims.

BRIEF DESCRIPTION OF THE DRAWINGS

The invention will now be described with reference to the accompanying drawings, which show a non-limiting embodiment thereof, wherein.

DETAILED DESCRIPTION OF PREFERRED EMBODIMENTS OF THE INVENTION

The invention will now be described in detail with reference to the accompanying Figures, so as to allow a person skilled in the art to carry it out and to use it. Possible changes to the embodiments described herein will be immediately evident to skilled people and the generic principles described herein can be applied to other embodiments and applications without for this reason going beyond the scope of protection of the invention set forth in the appended claims. Therefore, the invention cannot be considered as limited to the embodiments described and shown herein, but it has to be associated with the widest scope of protection possible in accordance with the principles and the features described and claimed herein.

Figure 1:
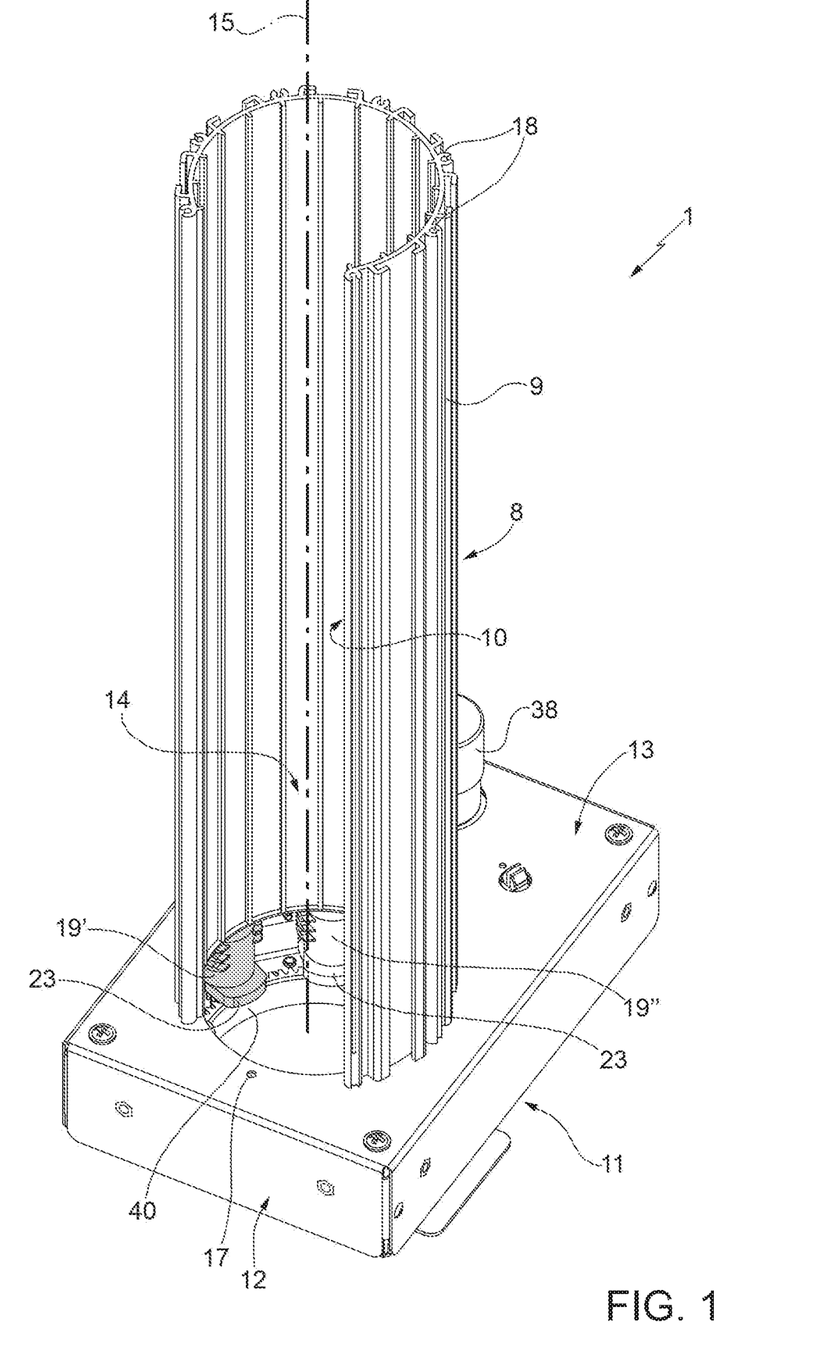
FIG. 1 is a perspective view of a preferred embodiment of the device for dispensing items, in particular lids, of the invention.

In FIG. 1, number 1 indicates, as a whole, a device for dispensing items from a stack 2 of nested items, in particular cup lids 3.

The dispensing device 1 preferably is configured to operate inside a beverage vending machine or a separate module operatively associated with the beverage vending machine, so as to provide the lids to be coupled to the cups used for the beverages, in particular high-capacity cups designed to contain beverages to be drunk "on to go", for instance American coffee, latte, etc. To this aim, the dispensing device 1 can be automatically operated by a control system of the beverage vending machine so as to pick up the lids 3 from the bottom of the stack 2 and drop them in a removal compartment, which can be accessed by a user from the outside.

Figure 2:
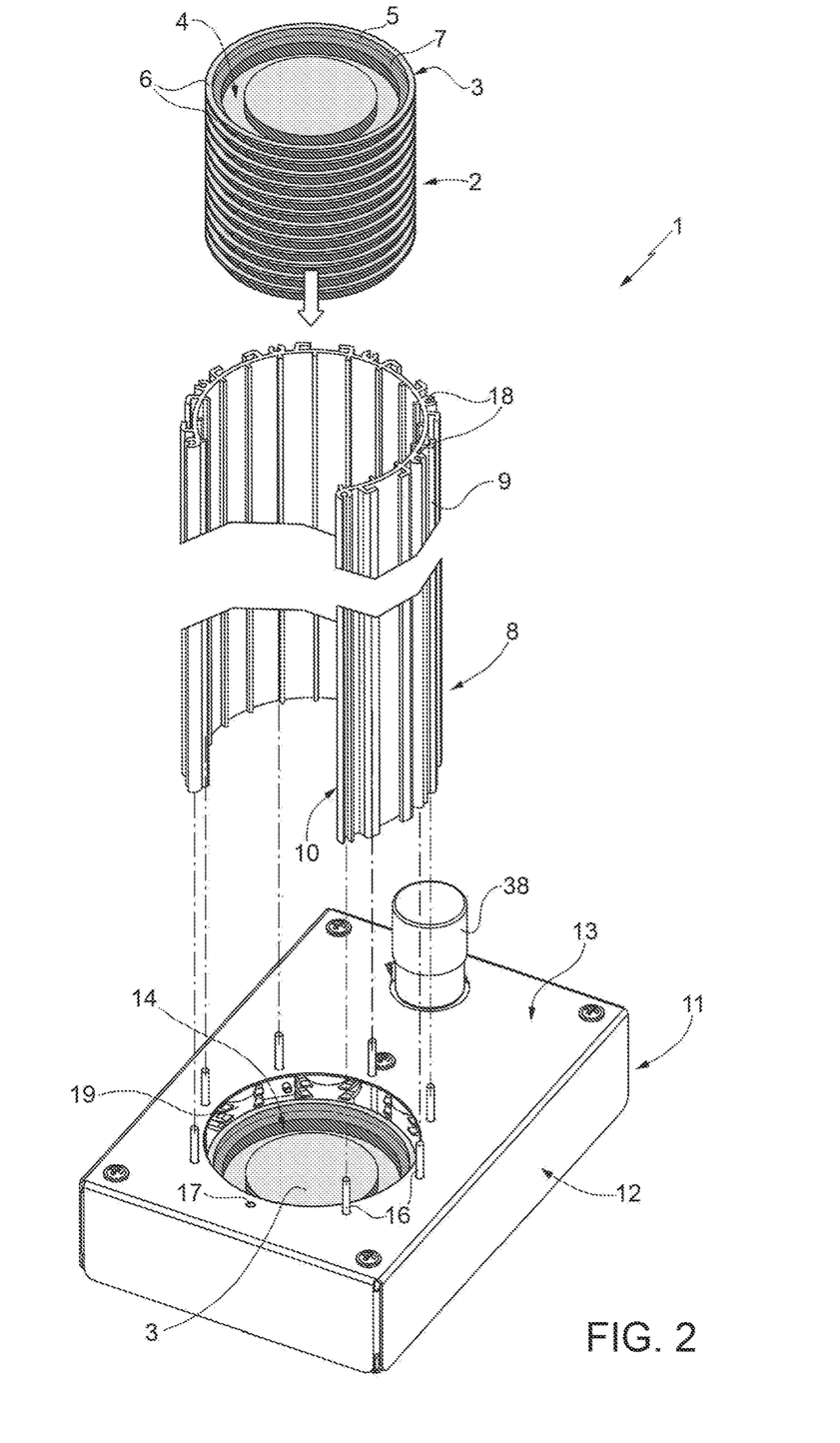
FIG. 2 is an exploded view, with the addition of the lids, of the dispensing device of FIG. 1.
Figure 6A:
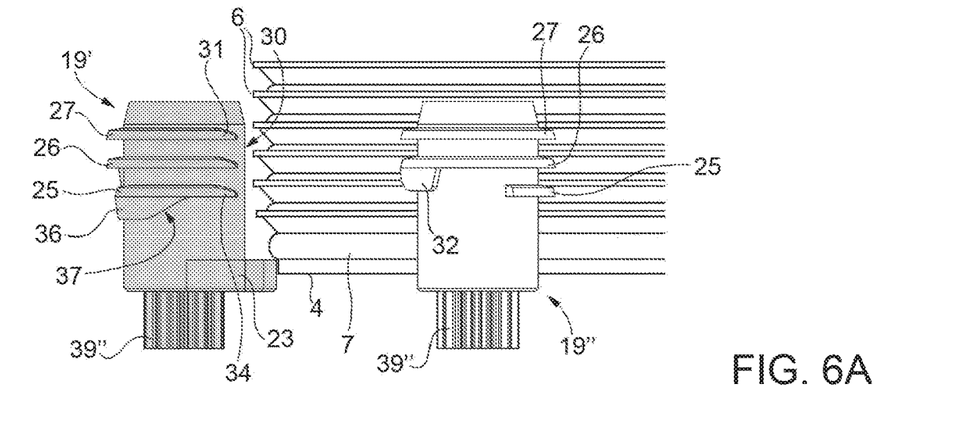
FIGS. 6A to 6C schematically show, with parts removed for greater clarity, a first operating sequence of the dispensing device of the invention.
Figure 6B:
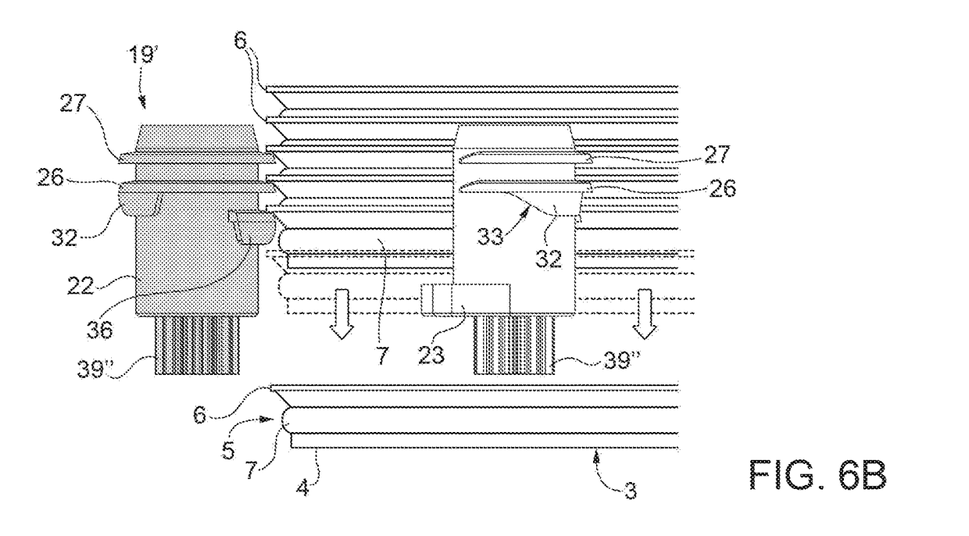

According to FIGS. 2 and 6B, the lid 3 provided by the dispensing device 1 preferably is made of plastic and is designed by a cup-shaped body, which comprises a bottom wall 4 and a substantially cylindrical side wall 5 and has, along its free edge, a rim 6, which radially projects outward from the side wall 5.

Furthermore, the side wall 5 preferably has, on the outside and at a given distance from the rim 6, an annular projection 7, which defines, inside the lid 3, a recess, which, when the lid 3 is connected to a cup, is designed to be engaged, in an interlocking and removable manner, by the free edge of the cup so as to axially constrain the lid 3 to the cup.

According to FIGS. 1 and 2, the dispensing device 1 comprises a tower magazine 8, which is configured to house a stack 2 of lids 3 and is defined by a tubular member 9 with a C-shaped cross-section having a substantially vertical axis and a diameter that is larger than a maximum diameter of the lids 3.

The tubular member 9 conveniently is provided with a longitudinal opening 10, which is sized so as to allow an operator to laterally access, with a hand, the magazine 8 during the loading of a new stack 2 of lids 3 so as to accompany the stack 2 downward, keeping the lids 3 compact and correctly oriented.

The dispensing device 1 further comprises a denesting unit 11, which is associated with the magazine 8 and is controlled by an electronic control unit (which is not shown herein) of the beverage vending machine so as to detach a lid 3 from the bottom of the stack 2 housed in the magazine 8 ever time a user's selection requires the supply of a lid 3 to be coupled to the cup with the beverage.

The denesting unit 11 comprises a box-shaped frame 12, which is designed to be fixed inside the beverage vending machine and comprises an upper wall 13 on which the magazine 8 is mounted.

More in detail, the tubular member 9 of the magazine 8 is mounted on the upper wall 13 in a position coaxial to a channel 14, which extends through the box-shaped frame 12 along a substantially vertical axis 15, has a diameter approximately equal to the diameter of the tubular member 9 and defines an output for the lids 3 taken from the magazine 8.

According to FIG. 2, the tubular member 9 is connected to the upper wall 13 so that it can easily and quickly be detached from the box-shaped frame 12 and be repositioned in a different angular position about the axis 15. This feature of the magazine 8 is an inventive and advantageous aspect of the dispensing device 1 regardless of other advantages, which will be discussed below, concerning the geometry and the functionality of the denesting unit 11. The advantage resulting from how the magazine 8 is coupled to the box-shaped frame 12 is that of allowing the longitudinal opening 10 of the tubular member 9 to be placed in different angular positions about the axis 15 depending on the arrangement and the orientation of the dispensing device 1 inside the beverage vending machine, so as to improve as much as possible the accessibility to the magazine 8 and, hence, facilitate the loading operations carried out to load the stack 2 into the magazine 8.

The removable magazine-frame connection is obtained by means of screws 16 distributed about the axis 15 and each having a first end inserted in a respective hole 17 made in the side wall 13 and a second end inserted in a respective longitudinal slot 18 made in the tubular member 9. Alternatively, the screws 16 can be replaced by non-threaded pins.

The screws 16 can be unscrewed from the holes 17 and screwed into other holes 17 depending on the position to be assumed by the longitudinal opening 10. The number and the angular distance of the holes 17 are chosen based on the degree of variability that one wants to give to the angular position of the longitudinal opening 10 about the axis 15. In the example shown, the holes 17 are uniformly distributed about the axis 15 at an angular distance of 45°.

According to a variant which is not shown herein, the screws 16 are integral to the tubular member 9.

The denesting unit 11 further comprises denesting rollers 19, which are arranged inside the box-shaped frame 12 about the channel 14 and are operated by an actuator 20 controlled by the electronic control unit (which is not shown herein) so as to move, as explained more in detail below, from a rest position (FIGS. 6A and 6C), in which the denesting rollers 19 support a stack 2 of lids 3, which is arranged in the magazine 8 and engages the channel 14, to a single release position (FIG. 6B), in which the rollers detach one single lid 3 from the bottom of the stack 2, or from said rest position to a multiple release position (FIG. 7A), in which the denesting rollers 19 detach the last two lids 3 from the bottom of the stack 2.

In particular, the denesting rollers 9 are mounted so as to rotate about respective axes 21 parallel to the axis 15 and are controlled so as to move from the rest position to the single release position by means of a rotation by a first angle and in a first rotation direction, and to move from the rest position to the multiple release position by means of a rotation by a second angle, equal to or different from the first angle, and in a second rotation direction opposite to the first direction.

To this aim, the denesting rollers 19 are provided with support elements designed to support the stack 2 in the rest position and in the single release and multiple release positions and with separator elements designed to detach one lid 3 from the bottom of the stack 2 in the single release position and two lids 3 in the multiple release position.

With reference to FIGS. 3, 4A-4C and 5A-5C, in the preferred embodiment shown therein, the denesting rollers 19 are of two types, which occupy alternated positions about the channel 14.

In particular, the denesting rollers of a first type (shown in FIGS. 4A-4C and hereinafter indicated with 19' for greater clarity) comprise a cylindrical body 22 coaxial to the relative axis 21 and, at a lower end of the cylindrical body 22, a shelf 23, which makes up a first one of said support elements and fulfils the function of supporting, together with the other selves 23, the stack 2 in the rest position.

Figure 4A:
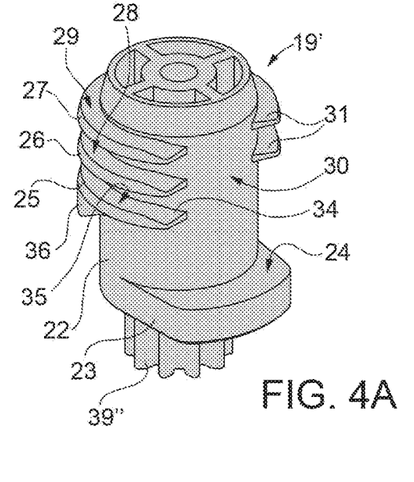
FIGS. 4A, 4B and 4C show a first detail of FIG. 3 from respective different angles.
Figure 4B:
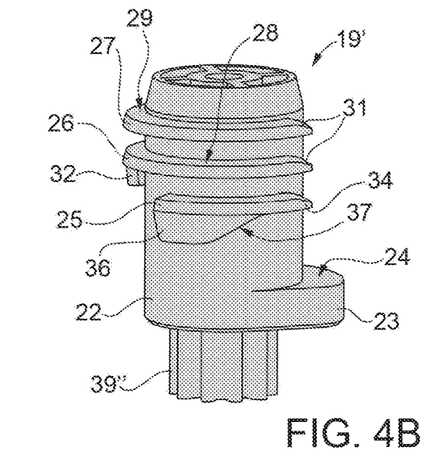
Figure 4C:
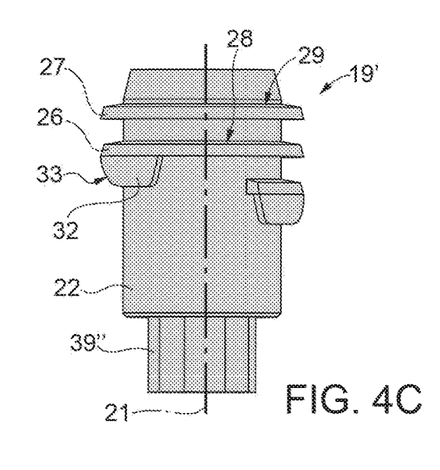
Figure 5A:
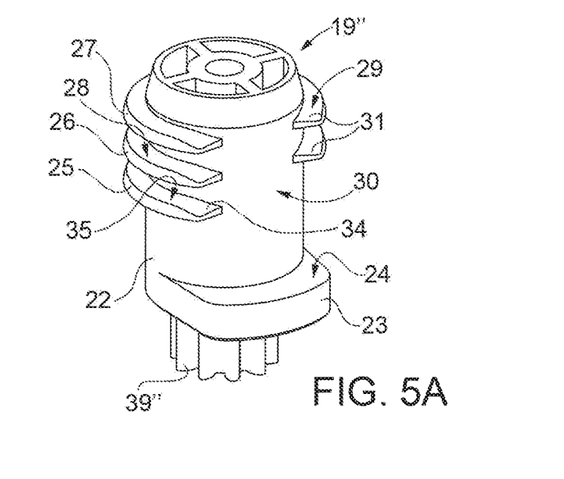
FIGS. 5A, 5B and 5C show a second detail of FIG. 3 from respective different angles.
Figure 5B:
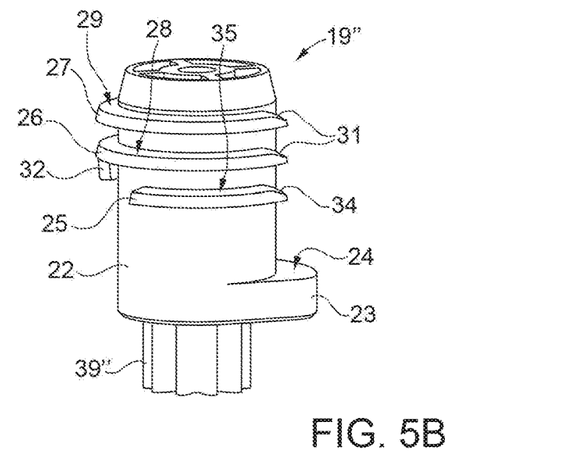
Figure 5C:
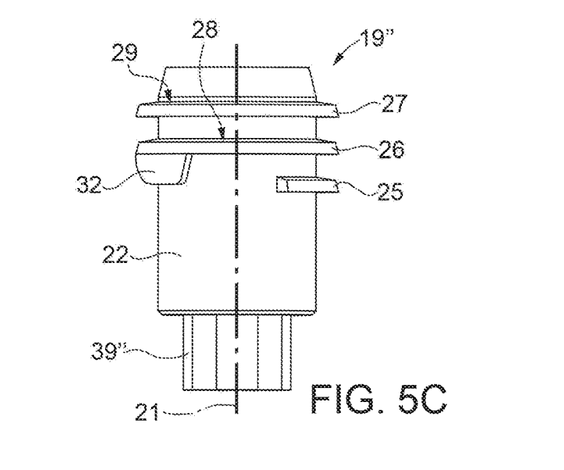

The shelf 23 is defined by a usually lunula-shaped appendage radially projecting from a lower end of the cylindrical body 22 and delimited, at the top, by a substantially horizontal surface 24.

The denesting roller 19' further comprises, close to an upper end of the cylindrical body 22, three further support elements defined, from the bottom to the top, by a first-level shelf 25, a second-level shelf 26 and a third-level shelf 27, which lie on respective planes, which are equally spaced apart from one another, are parallel to one another and are perpendicular to the axis 15.

The first-level, second-level and third-level shelves 25, 26 and 27 fulfil the function of supporting the stack 2 in the single release and multiple release positions.

The second-level and third-level shelves 26 and 27 are delimited, at the top, by respective substantially horizontal upper surfaces 28 and 29, extend about the cylindrical body 22 along arcs with the same width and are arranged on top of one another so as to set free, on the cylindrical body 22, an angular sector 30 which is vertically aligned with the shelf 23 and has an angular width comparable to the one of the latter. Both the second-level and the third-level shelves 26 and 27 have respective tapered ends 31, which, as discussed more in detail below, help them be inserted between the rims 6 of the lids 3.

The second-level shelf 26 differs from the third-level shelf 27 in that it is provided with a separator element 32, which is configured to be inserted, when the denesting roller 19' rotates towards the multiple release position, between the rims 6 of the second last and third last lid 3, so as to progressively separate them until the last and the second last lid 3 of the stack 2, nested together, are detached and dropped downward.

To this aim, the separator element 32 is defined by a curved abutment, which is arranged close to a tapered end 31 of the second-level shelf 26, projects downward from the side of the second-level shelf 26 opposite the upper surface 28 and extends about the cylindrical body 22 along an angularly staggered arc relative to the shelf 23. The separator element 32 is delimited, at the end closest to the tapered end 31, by an inclined plane 33 having the function of encouraging a progressive insertion of the separator element 32 between the rims 6.

The first-level shelf 25 is arranged under the second-level shelf 26, has a tapered end 34 vertically aligned with the tapered end 31 of the second-level shelf 26 farthest from the separator element 32 and extends about the cylindrical body 22 along an arc with a smaller width compared to the second-level and third-level shelves 26, 27.

The first-level shelf 25 has a substantially horizontal upper surface 35 and further comprises a separator element 36, which is configured to be inserted, when the denesting roller 19' rotates towards the single release position, between the rims 6 of the last and second last lid 3, so as to progressively separate them until the last lid 3 of the stack 2 is detached and dropped downward.

Similarly to the separator element 32, the separator element 36 is defined by a curved abutment, which is arranged close to the tapered end 34, projects downward from the side opposite the upper surface 35, is angularly staggered relative to the shelf 23 and is delimited, at the end closest to the tapered end 34, by an inclined plane 37 fulfilling the function of encouraging the progressive insertion of the separator element 36 between the rims 6.

The separator element 32 and the separator element 36 are angularly staggered relative to one another and are arranged about the cylindrical body 22 in such a way that, during the rotation from the rest position to the single release position, the sole separator element 36 engages the stack 2 and, vice versa, during the rotation in the opposite direction, from the rest position to the multiple release position, the sole separator element 32 engages the stack 2.

The denesting rollers of the second type (shown in FIGS. 5A-5C and hereinafter indicated with 19" for greater clarity) are the same as the denesting rollers 19' except for the separator element 36, which is absent in the denesting rollers 19", whereas there is the separator element 32 arranged on the second-level shelf 26.

According to a variant which is not shown herein, the denesting rollers 19" are provided with both separator elements 32 and 36.

According to a further variant which is not shown herein, the denesting rollers 19' are provided with the sole separator element 36 arranged on the first-level shelf 25 and the denesting rollers 19" are provided with the sole separator element 32 arranged on the second-level shelf 26.

According to a further variant which is not shown herein, the denesting rollers 19' and/or the denesting rollers 19" only have the first-level shelf 25 and the second-level shelf 26, whereas there is no third-level shelf 27.

Figure 3:
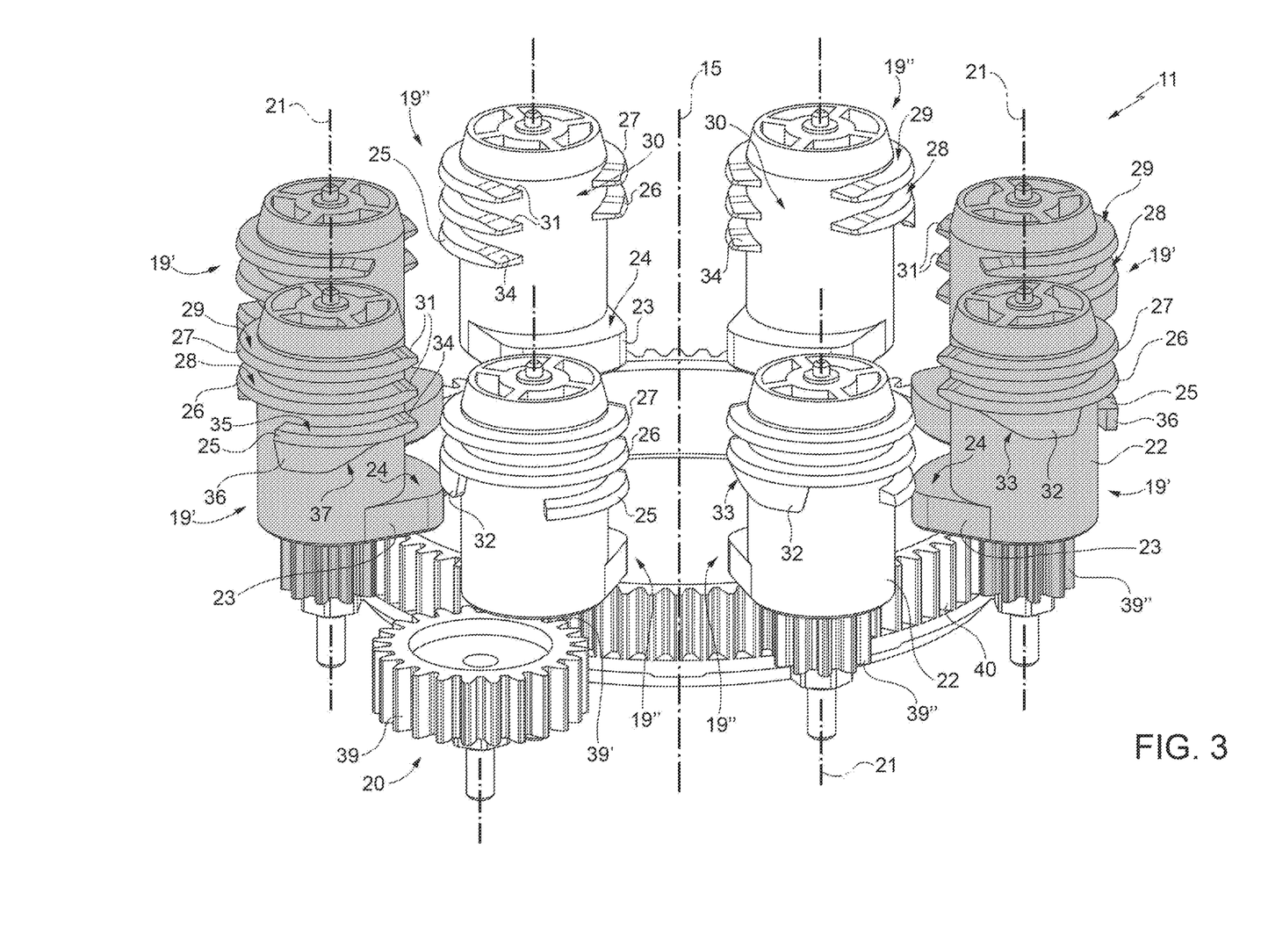
FIG. 3 shows, on a larger scale, a detail of FIG. 1.

According to FIG. 3, the actuator 20 is configured to simultaneously rotate all rollers 19' and all rollers 19" about the respective axes 21. To this aim, the actuator 20 comprises a motor 38, which is mounted on the frame 12, and a gear transmission comprising a gear wheel 39, which is connected to an output shaft of the motor 38 in a kinematic manner so as to rotate about an axis of its parallel to the axes 21 and to the axis 15 and meshes with a pinion 39', which is coaxial and integral to one of the denesting rollers 19. The rotary movement is transmitted to the other denesting rollers 19 through pinions 39", each of them being coaxial and integral to a respective denesting roller 19, and a crown gear 40, which is coaxial to the axis 15 and meshed with the pinion 39' and with the pinions 39".

The operation of the dispensing device 1 will now be described with special reference to FIGS. 6A-6C and 7A, 7B.

Figure 6C:
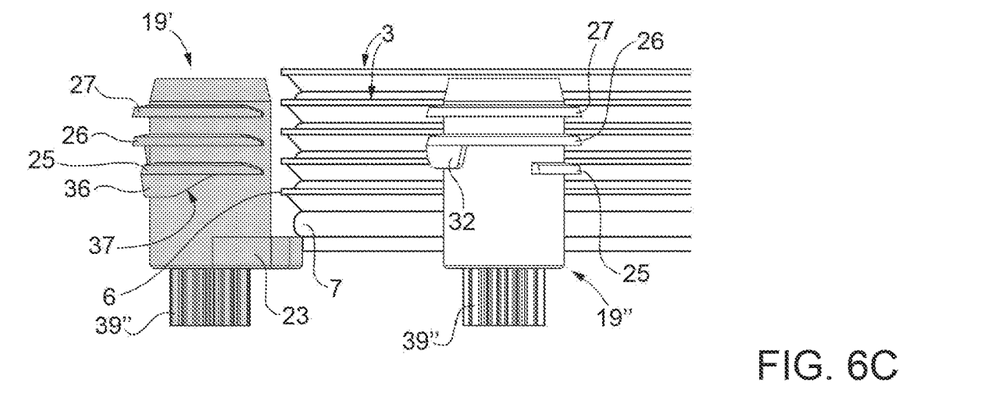

FIGS. 6A-6C show a "normal" operating cycle, namely an operating cycle in which, at the end, the denesting unit 11 provides one single lid 3.

FIG. 6A shows the rest position, in which the denesting rollers 19' and 19" are standing still and the respective shelves 23 are oriented radially relative to the axis 15 and partially extend inside the channel 14 (FIGS. 1 and 3) so as to define, together, a support for a peripheral portion of the last lid 3 of the stack 2.

In the stack 2 housed in the magazine 8, the lids 3 are nested in a reverse position relative to their normal use, namely with the bottom wall 4 arranged at the bottom (FIG. 2). In the example shown in the figures, said peripheral portion of the last lid 3 engaging the shelves 23 is defined by the annular projection 7 of the last lid 3.

In case lids 3 without the projection 7 are used, the peripheral portion of the last lid 3 resting on the shelves 23 is defined by the peripheral portion of the bottom wall 4 of the last lid 3.

Following a control signal of the electronic control unit (which is not shown herein), the actuator 20 is operated so as to rotate the rollers 19' and 19" in a counterclockwise direction and by an angle that is wide enough to cause the separator element 36 to be inserted between the rims 6 of the last and second last lid 3 (FIG. 6B) until the last lid 3 is detached and dropped.

During this rotation, the shelf 23 moves to the side, thus stopping acting like a support for the stack 2, which is supported by the first-level, second-level and third-level shelves 25, 26 and 27, which are sized and spaced apart so as to be inserted between the rims 6 of the lids 3 arranged immediately on the last lid 3.

Preferably, the rotation angle from the rest position to the single release position is approximately 120°.

After the last lid 3 has been detached, the rollers 19' and 19" are rotated in the opposite direction and brought back to the rest condition. During this rotation, the first-level, second-level and third-level shelves 25, 26 and 27 progressively slip off the rims 6 until the stack 2, no longer supported, slightly moves downward and rests again on the shelves 23 (FIG. 6C).

Figure 7A:
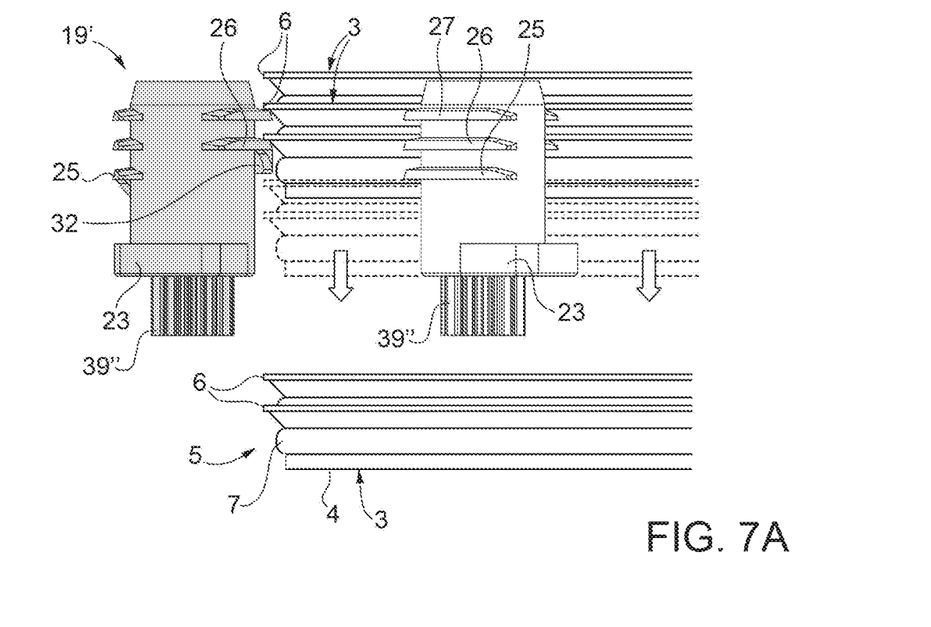
FIGS. 7A and 7B schematically show, with parts removed for greater clarity, a second operating sequence of the dispensing device of the invention.
Figure 7B:
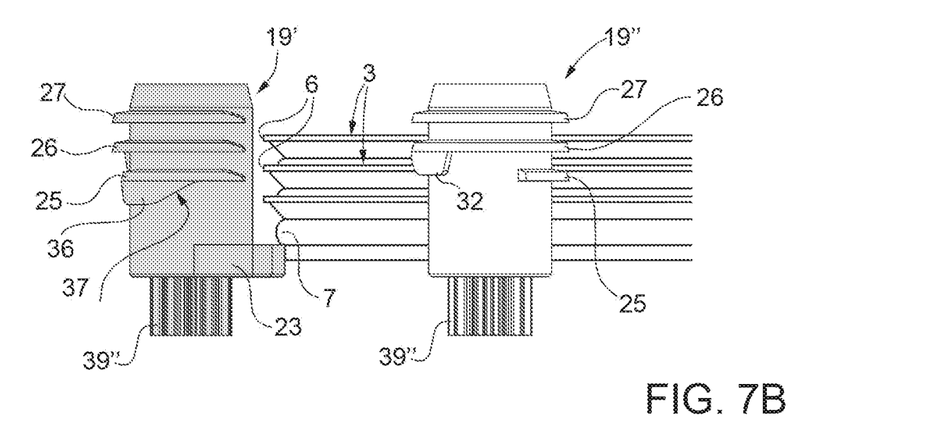

FIGS. 7A and 7B show a "reset" operating cycle, namely an operating cycle carried out in case the "normal" operating cycle fails in delivering one single lid 3. The lids 3 can indeed deform and be compacted together, thus locking themselves into one another in a hardly removable manner and, as a consequence, the denesting unit 11 cannot deliver a lid 3 at the end of the "normal" operating cycle. The "reset" operating cycle fulfils the function of simultaneously detaching the last two nested lids 3, thus preventing the dispensing device 1 from stopping because of a malfunctioning.

The "reset" operating cycle starts from the rest position (FIG. 6A) and goes on with the rotation of the denesting rollers 19' and 19" in a clockwise direction and by a rotation angle that is wide enough to bring the shelf 23 out of the channel 14 and to cause the separator element 32 to be inserted between the rims 6 of the second last and of the third last lid 3, whereas the stack 2 rests on the first-level, second-level and third-level shelves 25, 26 and 27.

Preferably, the rotation angle from the rest position to the multiple release position is approximately 120°.

After the last two lids 3 have been detached, the rollers 19' and 19" are rotated in the opposite direction and brought back to the rest condition.

In order to complete the information given above, it should be pointed out that the denesting rollers 19 are conveniently arranged about the channel 14 grouped in pairs by type (FIG. 3). This arrangement proves to be advantageous in a "normal" operating cycle, in case the lids 3 are ovalized. In this case, indeed, the thrust given by the separator elements 36 is not uniform along the periphery of the last lid 3 and at least partly makes up for the deformity of the lids 3, thus being more effective than a uniformly distributed thrust.

According to a variant, the rollers 19' and 19" can be arranged in alternated positions about the axis 15.

Finally, it should be pointed out that the same functional principle described above, which allows one or more lids 3 to be detached from the bottom of the stack 2, could be reiterated to detach three or more nested lids 3, for example in case the "reset" cycle described above does not end with the detachment of the last two lids 3.

In order to detach, for instance, the last three nested lids 3, the denesting rollers 19' and/or 19" need to have a third separator element arranged on the third-level shelf and located downstream, in the direction of rotation towards the multiple release position, and angularly staggered relative to the separator element 32 of the second-level shelf 26.

The invention claimed is:

1. An item dispensing device for dispensing items from a stack of nested items, each item of the stack is defined by a cup-shaped body having an annular outwardly extending rim at a free edge thereof; the item dispensing device comprising:
  a tower magazine that has a first substantially vertical axis and is designed to contain the stack of nested items; and
  a denesting unit arranged at a lower end of the tower magazine and operable to detach items of the stack from a bottom of the stack; the denesting unit includes a plurality of denesting rollers rotatably mounted about respective substantially vertical second axes and distributed about the first substantially vertical axis to define a channel therebetween adapted to be engaged by last items of the stack;
  wherein each of the plurality of denesting rollers includes a lower shelf, a first upper shelf above the lower shelf, and a second upper shelf above the first upper shelf; some of the plurality of denesting rollers include at least a respective first separator carried by the first upper shelf, and other ones of the plurality of denesting rollers include at least a respective second separator carried by the second upper shelf;
  wherein the plurality of denesting rollers are mounted to rotate about the respective substantially vertical second axes between a rest position in which the stack rests on the lower shelves, and a single release position in which the first separators engage the stack to detach a last item that is arranged at the bottom of the last items of the stack; and to rotate between the rest position and a multiple release position in which the second separators engage the stack to detach at least two nested items arranged at the bottom of the stack; and
  wherein the plurality of denesting rollers are configured to move from the rest position to the single release position by a rotation of a first angle in a first rotation direction, and to move from the rest position to the multiple release position by a rotation of a second angle, equal to or different from the first angle, in a second rotation direction opposite to the first direction.

2. The item dispensing device of claim 1, wherein in the single release position and in the multiple release position, the lower shelves are arranged outside of the channel, and the first and the second upper shelves of each of the plurality of denesting rollers engage corresponding rims of the items so as to support the stack.

3. The item dispensing device of claim 1, wherein the plurality denesting rollers include a first series of denesting rollers provided with both the first and the second separators, and a second series of denesting rollers provided only with the second separator.

4. The item dispensing device of claim 3, wherein two denesting rollers of the first series alternate with two denesting rollers of the second series about the first substantially vertical axis.

5. The item dispensing device of claim 1, wherein the items include cup lids.

6. The item dispensing device of claim 1, further comprising an electronic control unit configured to cause the denesting unit to carry out a normal operating cycle in which the denesting rollers move from the rest position to the single release position, and vice versa, to dispense a single item; and, in case of malfunctioning of the normal operating cycle, to cause the denesting unit to carry out a reset operating cycle in which the plurality of denesting rollers move from the rest position to the multiple release position, and vice versa, to simultaneously dispense two nested items of the stack.

7. The item dispensing device of claim 1, wherein the denesting unit includes a box-shaped frame housing the plurality of denesting rollers; the tower magazine includes a tubular member that has a C-shaped cross-section and a longitudinal opening, is coaxial to the channel, and is removably connected to the box-shaped frame to be quickly and easily detached from the box-shaped frame and reconnected thereto in a same or in a different angular position about the first axis.

8. An item dispensing device for dispensing items from a stack of nested items, each item of the stack is defined by a cup-shaped body having an annular outwardly extending rim at a free edge thereof; the item dispensing device comprising:
  a tower magazine that has a first substantially vertical axis and is designed to contain the stack of nested items; and
  a denesting unit arranged at a lower end of the tower magazine and operable to detach items of the stack from a bottom of the stack; the denesting unit includes a plurality of denesting rollers rotatably mounted about respective substantially vertical second axes and distributed about the first substantially vertical axis to define a channel therebetween adapted to be engaged by last items of the stack;
  wherein each of the plurality of denesting rollers includes a lower shelf, a first upper shelf above the lower shelf, and a second upper shelf above the first upper shelf; some of the plurality of denesting rollers include at least a respective first separator carried by the first upper shelf, and other ones of the plurality of denesting rollers include at least a respective second separator carried by the second upper shelf;
  wherein the plurality of denesting rollers are mounted to rotate about the respective substantially vertical second axes between a rest position in which the stack rests on the lower shelves, and a single release position in which the first separators engage the stack to detach a last item that is arranged at the bottom of the last items of the stack; and to rotate between the rest position and a multiple release position in which the second separators engage the stack to detach at least two nested items arranged at the bottom of the stack; and
  wherein the plurality denesting rollers include a first series of denesting rollers provided with both the first and the second separators, and a second series of denesting rollers provided only with the second separator.

9. The item dispensing device of claim 8, wherein two denesting rollers of the first series alternate with two denesting rollers of the second series about the first substantially vertical axis.

10. The item dispensing device of claim 8, wherein the plurality of denesting rollers are configured to move from the rest position to the single release position by a rotation of a first angle in a first rotation direction, and to move from the rest position to the multiple release position by a rotation of a second angle, equal to or different from the first angle, in a second rotation direction opposite to the first direction.

11. The item dispensing device of claim 8, further comprising an electronic control unit configured to cause the denesting unit to carry out a normal operating cycle in which the denesting rollers move from the rest position to the single release position, and vice versa, to dispense a single item; and, in case of malfunctioning of the normal operating cycle, to cause the denesting unit to carry out a reset operating cycle in which the plurality of denesting rollers move from the rest position to the multiple release position, and vice versa, to simultaneously dispense two nested items of the stack.

12. An item dispensing device for dispensing items from a stack of nested items, each item of the stack is defined by a cup-shaped body having an annular outwardly extending rim at a free edge thereof; the item dispensing device comprising:
- a tower magazine that has a first substantially vertical axis and is designed to contain the stack of nested items; and
- a denesting unit arranged at a lower end of the tower magazine and operable to detach items of the stack from a bottom of the stack; the denesting unit includes a plurality of denesting rollers rotatably mounted about respective substantially vertical second axes and distributed about the first substantially vertical axis to define a channel therebetween adapted to be engaged by last items of the stack;
- wherein each of the plurality of denesting rollers includes a lower shelf, a first upper shelf above the lower shelf, and a second upper shelf above the first upper shelf; some of the plurality of denesting rollers include at least a respective first separator carried by the first upper shelf, and other ones of the plurality of denesting rollers include at least a respective second separator carried by the second upper shelf;
- wherein the plurality of denesting rollers are mounted to rotate about the respective substantially vertical second axes between a rest position in which the stack rests on the lower shelves, and a single release position in which the first separators engage the stack to detach a last item that is arranged at the bottom of the last items of the stack; and to rotate between the rest position and a multiple release position in which the second separators engage the stack to detach at least two nested items arranged at the bottom of the stack; and
- an electronic control unit configured to cause the denesting unit to carry out a normal operating cycle in which the denesting rollers move from the rest position to the single release position, and vice versa, to dispense a single item; and, in case of malfunctioning of the normal operating cycle, to cause the denesting unit to carry out a reset operating cycle in which the plurality of denesting rollers move from the rest position to the multiple release position, and vice versa, to simultaneously dispense two nested items of the stack.

13. The item dispensing device of claim 12, wherein the plurality of denesting rollers are configured to move from the rest position to the single release position by a rotation of a first angle in a first rotation direction, and to move from the rest position to the multiple release position by a rotation of a second angle, equal to or different from the first angle, in a second rotation direction opposite to the first direction.

14. The item dispensing device of claim 12, wherein the plurality denesting rollers include a first series of denesting rollers provided with both the first and the second separators, and a second series of denesting rollers provided only with the second separator.

15. The item dispensing device of claim 14, wherein two denesting rollers of the first series alternate with two denesting rollers of the second series about the first substantially vertical axis.

* * * * *